Nov. 1, 1966  W. R. GRISWOLD  3,282,316
HOLD-DOWN FOR AVIATION EQUIPMENT WITH FRICTION NON-TURN DEVICE
Filed March 29, 1965
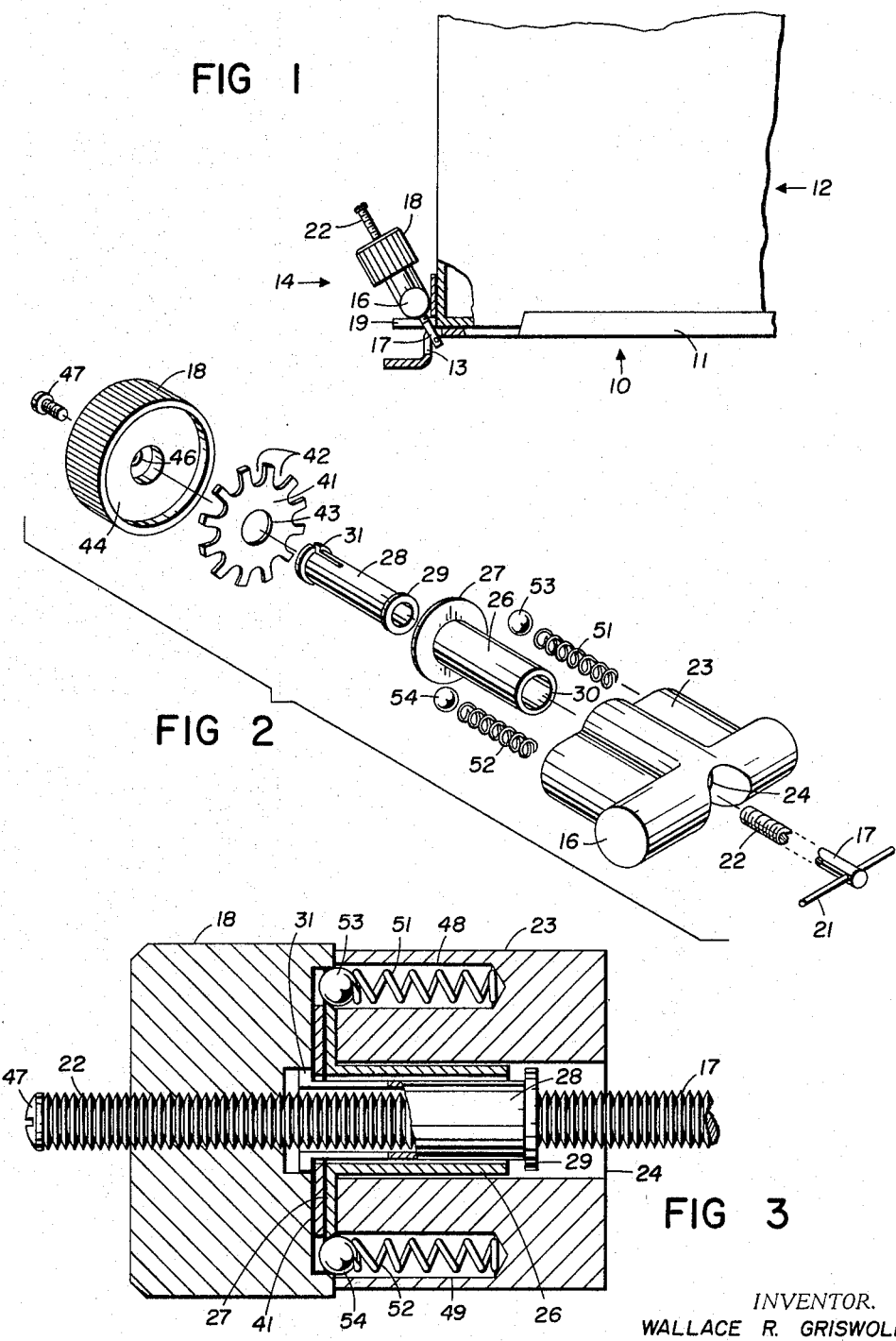
INVENTOR.
WALLACE R. GRISWOLD
BY
*Mand Moody*
ATTORNEY 3,282,316
HOLD-DOWN FOR AVIATION EQUIPMENT WITH
FRICTION NON-TURN DEVICE
Wallace Robert Griswold, Cedar Rapids, Iowa, assignor to Collins Radio Company, Cedar Rapids, Iowa, a corporation of Iowa
Filed Mar. 29, 1965, Ser. No. 443,436
3 Claims. (Cl. 151—41.5)

This invention relates in general to a locking means for a nut and in particular to a detented-lock nut.

In certain applications, it is necessary to assure that a threaded knob does not vibrate off a bolt. For example, in electronic equipment mounted in aircraft, it is customary to mount the electronic equipment on a shockmount by means of a nut and bolt and provide a hole through the bolt which may be wired to prevent the nut from being removed therefrom. This necessitates cutting the wire and rewiring the bolt each time the equipment is removed.

It is an object of the present invention to provide a spring loaded detent which effectively locks a knob to prevent it from rotating relative to a bolt.

Another object is to provide an improved tie-down holder for electronic equipment.

Further features, objects and advantages of this invention will become apparent from the following description and claims when read in view of the accompanying drawings, in which:

FIGURE 1 is a partial cut-away view of the hold-down device of this invention;

FIGURE 2 is an exploded view of the hold-down device according to this invention; and, FIGURE 3 is a sectional view of the detented nut and bolt assembly combination.

FIGURE 1 illustrates a base 10 which is formed with sides 11 to which an electronic equipment 12 is to be attached. A slot 13 is formed in the base 10 adjacent one edge thereof and a hold-down device 14 according to this invention is received through the slot. The hold-down device includes a T member 16 which is movable on a threaded shaft 17 to bear against a lug 19 which is attached to the electronic chassis 12. A knob 18 bears against the T member 16 to hold it against the lug 19.

The hold-down device is shown in exploded view in FIGURE 2. The threaded shaft 17 is formed with a cross member 21 which bears against the shockmount 10 to hold the shaft 17 to the shockmount. The upper portion 22 of the shaft 17 is threaded. A T member 16 is formed with a body portion 23 which has a central opening 24 through which the shaft 17 extends. A sleeve member 26 is formed with a central opening 30 which extends through the opening 24 of the T member and fits about the shaft 17. Sleeve member 26 is formed with an enlarged shoulder portion 27. A plastic insert member 28 is received within sleeve 26 and is formed with enlarged portions 29 and 31.

A washer 41 is formed with a plurality of openings 42 about its periphery and has a central opening 43 through which the shaft 17 extends. The washer 41 is press-fitted into a depression 44 formed in the knob 18. The internal opening 46 of knob 18 is threaded so as to allow it to move longitudinally on shaft 17 as the knob is rotated. A limit bolt 47 is threaded into the end of shaft 17 to prevent the knob 18 from being completely removed from the shaft 17.

The knob 18, T member 16 and inserts 26 and 28 are shown in the assembled relationship in FIGURE 3. The T member 16 is formed with a pair of openings 48 and 49 which receive therein springs 51 and 52 which bias ball bearings 53 and 54 to the left relative to FIGURE 3. The enlarged portion 27 of sleeve 26 prevents the ball bearings from moving completely out of the openings 48 and 49; however, they extend partially from the opening so as to detent in the slots 42 formed in the washer 41.

In operation assume, relative to FIGURE 1, that the knob 18 is loose and electronic equipment 12 is placed on the shockmount 10. The bolt and tie-down assembly is moved to the portion shown and the knob 18 is rotated to force the T member 16 against the lug 19. The cross member 21 of the shaft 17 bears against the shockmount and the T member bears against the lug 19 to form a tight fit between the lug 19 and the shockmount. It is to be realized of course that the rear end of the radio equipment is held down by another means not shown. Such means often consist of a bayonet pin which is received in a slot formed in the shockmount, for example.

As the knob 18 is rotated, it tightens the T member until sufficient pressure is exerted by the lug 19 on the T member to prevent it from moving toward the cross member 21. Then the knob may be rotated further to depress the springs 51 and 52 and the balls 53 and 54. This provides a lock and detent and prevents knob 18 from rotating due to vibrations. The balls 53 and 54 are partially depressed at this time and lock the knob. When the chassis is to be removed from the shockmount, the knob may be manually rotated to overcome the detent action to loosen the knob and T-shaped member 16.

Although this invention has been described with respect to particular embodiments thereof, it is not to be so limited, as changes and modifications may be made therein which are within the spirit and scope of the invention as defined by the appended claims.

I claim:

1. A fastening means for attaching a first member to a second member comprising a threaded shaft, means for pivotably attaching one end of the shaft to the first member, a T-shaped member formed with an opening through which the shaft extends, a lug on the second member against which the T-shaped member bears, a threaded knob receivable on the shaft, a depression formed in the face of the knob and a detent member within said depression against which the T-shaped member bears, an opening formed in the T-shaped member, a spring and ball received in the opening such that the ball engages the detent member of the knob, means for limiting the outward motion of the ball so it is retained in the opening and is movable relative to the T-shaped member when the detent is engaged, a sleeve extending through the T-shaped member and the shaft extending therethrough and means on either end of the sleeve to attach the sleeve to the knob and to the T-shaped member such that limited longitudinal motion of the knob relative to the T-shaped member may occur.

2. In apparatus according to claim 1 wherein a second opening is formed in the T-shaped member and a second ball and spring are received within the second opening and the restraining means engages the second ball so as to restrict its movement relative to the depression.

3. In apparatus according to claim 1, means for preventing the knob from being removed from the threaded shaft.

References Cited by the Examiner

UNITED STATES PATENTS

| 150,801 | 5/1874 | Sykes | 151—39 |
| 612,046 | 10/1898 | Mathews et al. | 151—39 |
| 1,027,508 | 5/1912 | Schweinert et al. | 151—39 |
| 1,349,491 | 8/1920 | Burton | 151—40 |
| 2,635,751 | 4/1953 | Schroeder et al. | 151—41.5 |
| 3,124,993 | 3/1964 | Schlueter | 151—41.5 |

FOREIGN PATENTS

| 539,790 | 4/1922 | France. |
| 24,368 | 10/1913 | Great Britain. |

CARL W. TOMLIN, *Primary Examiner.*

M. PARSONS, Jr., *Assistant Examiner.*